INVENTOR
F. A. SZWADOWSKI
BY John C. Morris
ATTORNEY

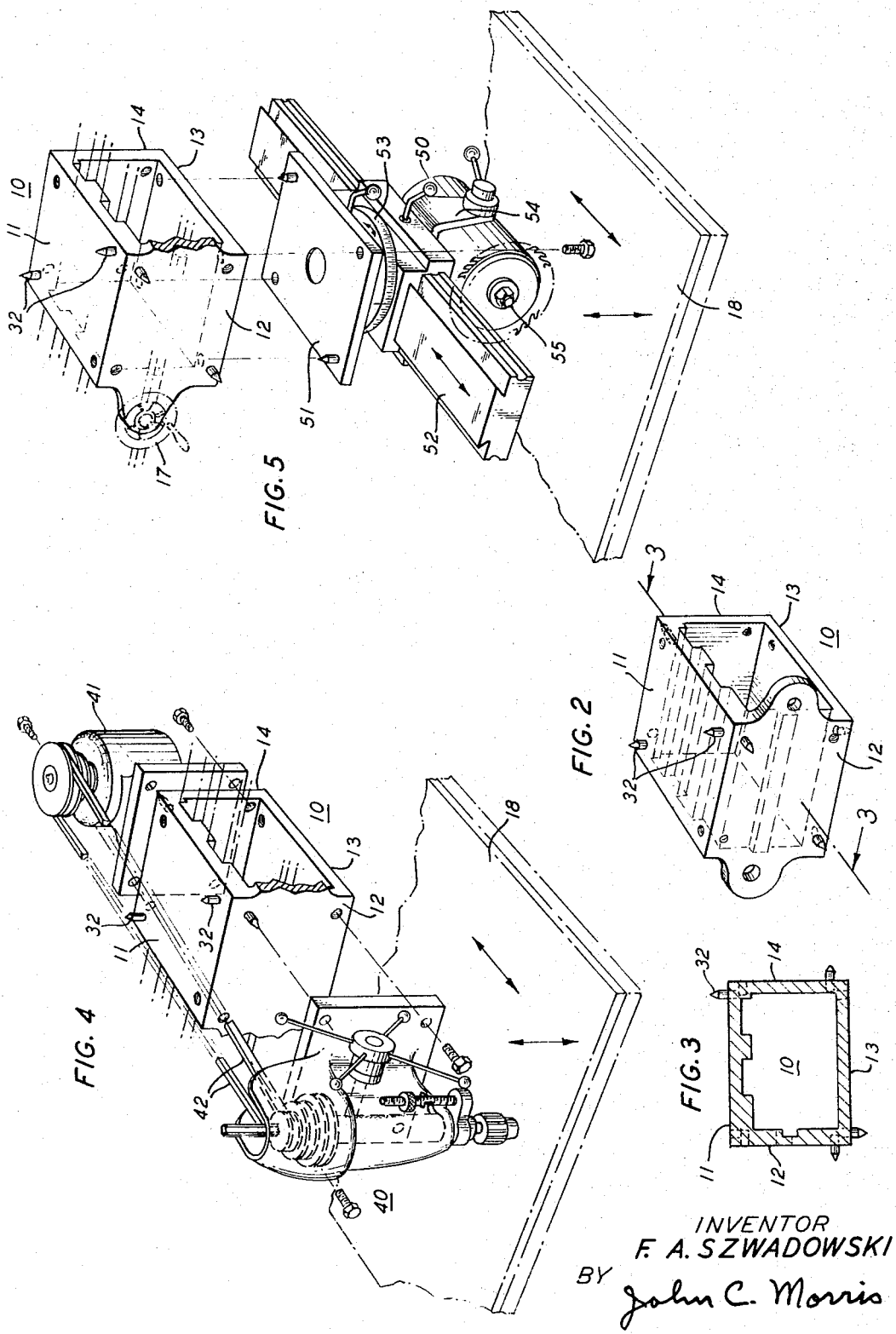

3,295,414
MACHINE TOOL FIXTURES
Frank A. Szwadowski, 462 Morris Ave.,
Summit, N.J. 07087
Filed Oct. 12, 1965, Ser. No. 495,198
7 Claims. (Cl. 90—11)

The invention herein disclosed and claimed is concerned with a machine tool assembly in which various different tools may be easily used on the same base. More specifically, it involves a fixture and appurtenances, whereby, various auxiliary tools may be facilely applied to a common base.

The basic tool may, for example, be a lathe with the fixture of the invention secured in adjustable relation to its ways or rails. The usual tool rest may be removably attached to the fixture, so that it may be detached and other tools may be attached in its stead. It is contemplated that the fixture have four mounting faces, so that tools or appurtenances may be attached to its top or bottom, or to its front or back.

As will appear more fully and clearly in the following description and in the appended drawings, as described therein, the main object of the invention is to facilitate the use of machine tools of the so called home shop variety.

The feature that accomplishes the indicated object, is the noted novel fixture that provides for the attachment of any of several tools to the basic tool frame. An additional feature is an adjustable table or platform for co-operating with those auxiliary tools that have working portions projecting below the fixture and which require a work support in this region.

In order that the invention may be suitably set forth, there follows a more detailed description thereof in connection with certain illustrative embodiments, as shown in the appended drawings in which FIG. 1 shows a lathe assembly including the fixture and table arrangement of this invention;

FIG. 2 is a perspective view of the fixture;

FIG. 3 is a sectional view taken on the line 3—3 of FIG. 2;

FIG. 4 is a fractional view showing how a drill press and its motor may be attached to the fixture; and FIG. 5 is another fractional view showing an arrangement for attaching an auxiliary motor to the fixture.

Figure 1:
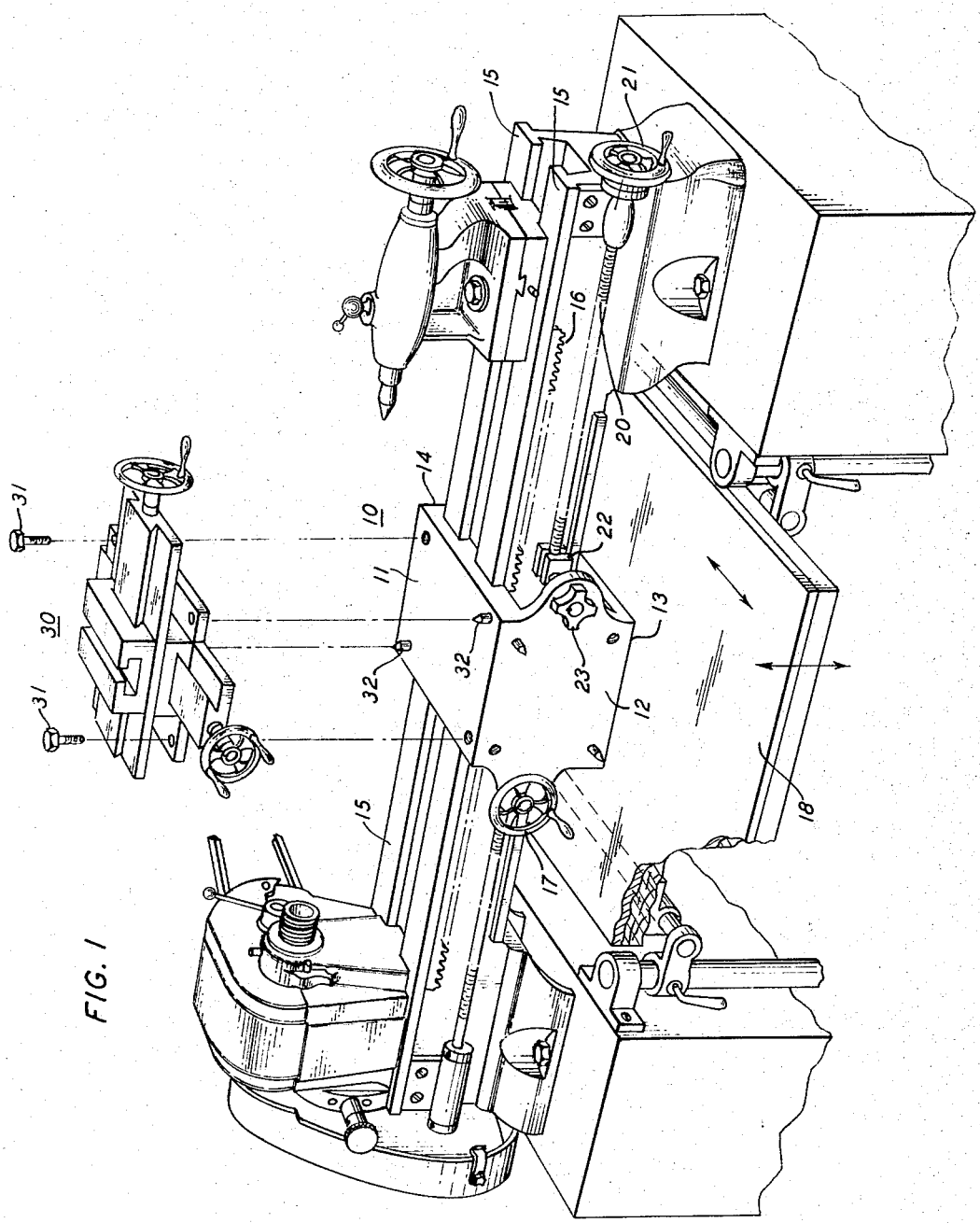

The fixture 10 is a hollow, boxlike structure having open ends. The sides, namely, the top 11, the front 12, the bottom 13, and the back 14 may be integral as shown, or one or more of them may be a separable part bolted or otherwise secured to the fixture assembly.

The fixture 10 is fitted to the lathe so as to embrace the rails and to be guided by the ways 15. The fixture may be traversed along the rails by means of a gear (not shown) meshing with the rack 16 and operated by an attached handwheel 17. A threaded shaft 20 may also be used to move the fixture longitudinally. The shaft 20 may be driven by a conventional connection to the lathe head or by means of a handwheel 21. In either case the fixture may be coupled to the shaft by means of a conventional split nut 22 operated by a knob 23.

As illustrated in FIG. 1, the usual lathe crosshead 30 may be secured to and located on the fixture 10 by means of the screws or bolts 31 and the pins 32, in this instance on the upper face 11 of the fixture. Various other securing means, such as clamps, and locating means such as bosses may be used if desired.

The illustration in FIG. 4 shows how a drill press 40 and its drive motor 41 may be attached respectively to the front face 12 and the back face 14 of the fixture 10. This tool may be driven by the belt 42, extending between the pulleys on the drill press and the motor.

The assembly shown in FIG. 5 comprises the motor 50 mounted by the plate 51 to the fixture 10. The motor is mounted for reciprocation on the slide 52, which is in turn adapted for rotation relative to the plate 51 by means partially shown at 53. The motor may be secured in a yoke, one arm of which is shown at 54, so that it may be rotated about a horizontal axis to allow the shaft 55 to assume various angles with respect to the plane of the table 18. The shaft 55 may carry a saw, as indicated in FIG. 5, a grinding wheel, or some other suitable tool. The table 18, which is both vertically and horizontally adjustable, is for use with the drill press 40, the saw, or any other tool requiring a support under the work.

Thus the fixture 10 and the table 18 of this invention are adapted to the conversion of a standard machine tool, such as a lathe, to a versatile, convertible tool of particular use in a home work shop.

Although individual motors have been indicated for the various attachments, a suitable conventional connection could obviously be made to the driving means of the basic machine in this case the lathe drive assembly.

The examples given herein are but illustrative of the many uses to which the particular devices of this invention may be put by virtue of the unique arrangements herein described and illustrated.

What is claimed is:

1. An arrangement for selectively adding various machine tools to a basic machine having supports and ways between them, the arrangement comprising a multifaced, rectangular sleeve embracing the ways and moveable therealong, each sleeve face having securing means mateable with other securing means associated with a selected tool, an adjustable work supporting table under the ways and between the supports of the basic machine, and required driving means.

2. An arrangement as in claim 1 in which the supporting table is both horizontally and vertically adjustable.

3. An arrangement as in claim 1 in which the driving means comprises an individual motor for each tool requiring power.

4. An arrangement as in claim 1 in which the securing means for the selected tool comprises mating studs and orifices, and clamping means.

5. An arrangement as in claim 1 including means for translating the sleeve along the ways to a desired position.

6. An arrangement as in claim 1 in which the basic machine is a lathe and the sleeve is constructed and arranged to support a conventional lathe crosshead or another tool substituted therefor.

7. A fixture for mounting in an adjustable manner any one of a plurality of selected machine tools on a basic machine having guiding ways, said fixture comprising a boxlike structure fitting on and guided for translation along the ways, the fixture having a plurality of faces each of which is equipped to receive a selected tool, and means for securing such a tool to the fixture.

No references cited.

WILLIAM W. DYER, JR., *Primary Examiner.*

G. A. DOST, *Assistant Examiner.*